April 27, 1943.                G. E. LANDT ET AL                2,317,920
                                    BEARING
                              Filed Dec. 24, 1941
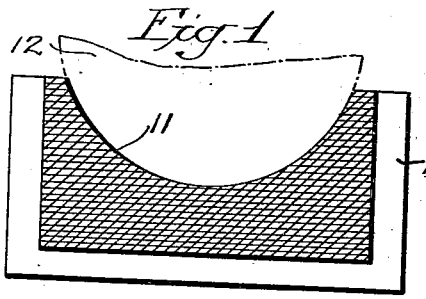
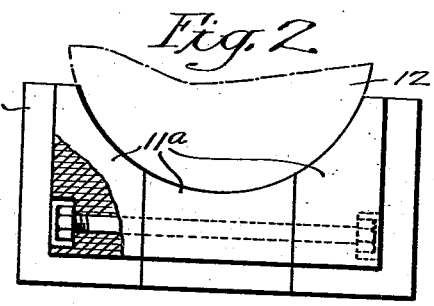
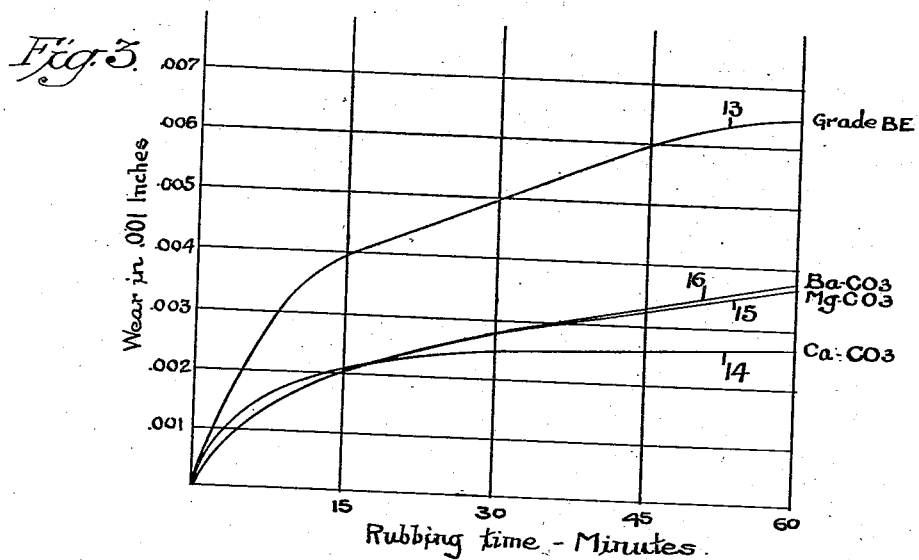
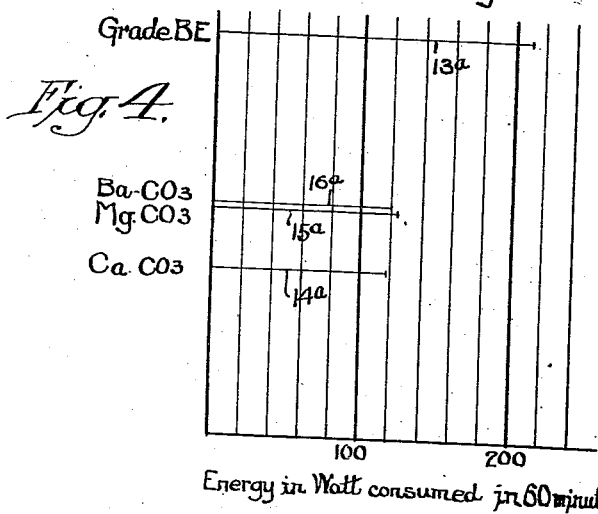
Inventors
Gustave E. Landt.
John A. Petko.
by their Attorneys.
Howson & Howson Patented Apr. 27, 1943

2,317,920

UNITED STATES PATENT OFFICE 2,317,920

BEARING

Gustave E. Landt, Norristown, and John A. Petho, Perkiomenville, Pa., assignors to Continental-Diamond Fibre Company, Newark, Del., a corporation of Delaware Application December 24, 1941, Serial No. 424,336

9 Claims. (Cl. 308—238)

This invention relates to bearings and bearing linings and, more particularly, to heavy duty journal bearings and linings therefor of the type discussed in patent to C. S. Brown, issued October 10, 1933, for "Bearing," No. 1,929,836.

Such bearings are usually provided with a liner made up of a plurality of superposed sheets of fabric impregnated with and adhered together by an infusible, insoluble resinous material, for example a phenolic resin. A hard, resilient, smooth bearing surface is thus provided. In place of the fabric sheets, chopped or mascerated canvas or duck or other cellulose fibrous material may be used as the filler in the bearing lining. This type of bearing is commonly used in situations where the load imposed upon the bearing is considerable, and, as is customary with bearings under such loads, the bearing interface is supplied with an aqueous solution, for example water, to serve as a coolant and lubricant.

In this type of bearing, difficulties have been encountered in the wear of bearing surface and this wear affects the accuracy with which shafts and mechanisms actuated from these shafts operate. It has been ascertained that the chief cause of such wear lies in roughening of the shafts, and that the character of the water or the aqueous solution supplied at the bearing interface as a lubricant and coolant will promote corrosion of the metal surface particularly, as is often the case, if the water is slightly acid. In some instances, for example with sea water, this corrosion is excessive. The roughened surface of the shaft caused by the corrosion in turn wears the surface of the bearing lining.

The principal object of the present invention is to provide a bearing lining for bearings lubricated by an aqueous solution, in which the pitting and roughening of the shaft due to corrosion and the consequent wearing of the surface of the bearing surface will be avoided or at least minimized.

Another object is to provide a bearing in the operation of which there is a considerable saving in power as compared to previous bearings of the same type.

In accordance with the present invention, there is incorporated in the bearing lining a substance, included in the resinous impregnating material, which acts as a neutralizing agent to reduce the acidity of the lubricant and coolant and accordingly inhibits the pitting and corrosion of the shaft. The neutralizing agent employed is of such nature that it may be readily dispersed through the bearing lining, at least at the surface of the bearing and in the region adjacent thereto, in the ordinary process of impregnation of the fibrous material employed in the bearing lining. The neutralizing agent used is preferably in powdered form, and the resinous material holds the agent firmly in the desired position so that it cannot be removed from the body of the bearing. In order that the neutralizing agent may continue to function during the continued use of the bearing, a substance substantially insoluble in the lubricant and coolant is selected. The insoluble neutralizing agent serves not only to neutralize the acidity of the lubricant, and consequently reduce corrosion of the shaft and the wear upon the bearing lining, but also serves to reduce materially the power consumption required in the operation of the bearing.

The neutralizing agent may be a carbonate, aluminate, or oxide substantially insoluble in water; for example, calcium, magnesium, and barium carbonate and aluminate, herein included in the term alkaline earth metal carbonate and aluminate, or zinc or tin oxide. Advantageously, the insoluble neutralizing agent selected is in a crystalline form, since even very small particles thereof will more readily anchor themselves in the synthetic resinous material with which the fibrous base material is impregnated. Of the insoluble neutralizing agents available for use in accordance with the present invention, the alkaline earth metal carbonates, and more particularly the crystalline forms thereof, are preferred. The amount of neutralizing agent present may vary widely, depending on the conditions to be encountered in the use of the bearing lining. There is present sufficient neutralizing agent to neutralize the acidity of the lubricant and coolant employed but insufficient to weaken the bearing lining or to destroy the desired surface provided by the resin film. In general, the amount of neutralizing agent will be present between about 10% to 30% by weight based on the weight of the undiluted resin employed in the impregnating varnish, preferably between 15% and 25%.

In the drawing:

Figs. 1 and 2 are transverse sectional views through bearings of the present invention;

Fig. 3 is a graph illustrating the comparative results obtained from ordinary bearings and from bearings embodying our invention; and Fig. 4 is a graph comparing the power consumption in ordinary bearings with those constructed in accordance with our invention.

Referring now more particularly to the drawing, the bearing comprises the usual bearing housing 10 within which is arranged a bearing lining consisting of a strong unitary body consolidated from fibrous material impregnated with a heat-hardened resinous material. This bearing lining comprises one body as shown at 11 in Figure 1 or segments as shown at 11a in Figure 2. In the present instance, the bearing has been shown as composed of laminated fabric sheet material consolidated in the formation thereof to produce a structure having a smooth, hard, resilient bearing surface for the reception of the journal 12. Obviously, however, the bearing may, likewise, be formed from impregnated chopped up fabric or other fibrous material, and in such case the fibrous material may be in a more or less laminated form or may be arranged haphazardly in the body thereof. In each instance, the material with which the fibrous material is impregnated is a resinous material converted into the hard, infusible, insoluble condition and containing a relatively insoluble, finely divided neutralizing agent at least at the surface of the bearing and in the region adjacent thereto.

In the manufacture of the bearing lining, the powdered neutralizing agent is advantageously dispersed in the resinous varnish used in the impregnation of the fibrous material, and the product is thereafter formed in accordance with the usual practice. Thus, after the fibrous material has been impregnated, it is placed in a suitable mold and the product is consolidated to the desired form and the resin converted to the insoluble, infusible stage by subjecting the material in the mold to suitable heat and pressure. Since the neutralizing agent is relatively inexpensive, it will usually be distributed throughout the bearing lining, but, if desired, as stated above, it may only be present at the surface of the bearing and in the region adjacent thereto.

Referring to the chart of Figure 2, and more particularly, to section A thereof, curve 13 illustrates a wear test of a bearing equipped with a standard bearing lining made of 4-ply belting impregnated with the phenol-formaldehyde resin, in a cured condition, of the type usually employed in the manufacture of such bearings. Curves 14, 15, and 16 illustrate wear tests made under identical conditions with bearings of the same structure impregnated with the same resin, except that in these cases, the varnish with which the fabric was impregnated had incorporated therein approximately 20% by weight of a neutralizing agent relatively insoluble in water on the basis of the weight of the undiluted resin used in preparing the varnish. Curves 13a, 14a, 15a, and 16a of Figure 4 show the power consumption of the bearings, the wear tests of which are shown in curves 13, 14, 15, and 16, respectively. The neutralizing agent employed in the bearing represented by curves 14 and 14a was finely divided crystalline calcium carbonate, while the substance employed in the bearings represented by curves 15, 15a and 16, 16a was crystalline magnesium carbonate and crystalline barium carbonate, respectively.

Referring to curves 13, 14, 15, and 16, it will be noted that the use of calcium carbonate, magnesium carbonate, and barium carbonate reduced the wear 68.5%, 44.7%, and 44.7%, respectively, compared with the wear of the standard bearing. Referring to curves 13a, 14a, 15a, and 16a, it will be seen that the use of calcium carbonate, magnesium carbonate, and barium carbonate lowered the power consumption 44.1%, 42.6%, and 43.6%, respectively, as compared to that of the standard bearing.

Considerable modification is possible in the neutralizing agent employed and in the amount thereof, as well as in the fibrous material and the resinous material employed, without departing from the essential features of the invention.

We claim:

1. A lining for bearings lubricated by an aqueous solution comprising a strong consolidated body of fibrous material impregnated with heat-hardened resinous material and having distributed through said resinous material, at least at the surface of the bearing lining and the region adjacent thereto, a finely divided relatively water-insoluble neutralizing agent in sufficient amount and distribution to neutralize the acidity of the lubricant employed in the operation of the bearing.

2. A lining for bearings lubricated by an aqueous solution comprising a strong consolidated body of superposed layers of fabric impregnated with heat-hardened resinous material and having distributed through said resinous material, at least at the surface of the bearing lining and the region adjacent thereto, a finely divided relatively water-insoluble neutralizing agent in sufficient amount and distribution to neutralize the acidity of the lubricant employed in the operation of the bearing.

3. A lining for bearings lubricated by an aqueous solution comprising a strong consolidated body of fibrous material impregnated with heat-hardened resinous material and having distributed through said resinous material, at least at the surface of the bearing lining and the region adjacent thereto, a finely divided alkaline earth metal carbonate in sufficient amount and distribution to neutralize the acidity of the lubricant employed in the operation of the bearing.

4. The bearing of claim 3 wherein the alkaline earth metal carbonate is in crystalline form.

5. A lining for bearings lubricated by an aqueous solution comprising a strong consolidated body of superposed layers of fabric impregnated with heat-hardened resinous material and having distributed through said resinous material, at least at the surface of the bearing lining and the region adjacent thereto, a finely divided alkaline earth metal carbonate in sufficient amount and distribution to neutralize the acidity of the lubricant employed in the operation of the bearing.

6. The bearing of claim 5 wherein the alkaline earth metal carbonate is in crystalline form.

7. The bearing of claim 5 wherein the alkaline earth metal carbonate is crystalline calcium carbonate.

8. A lining for bearings lubricated by an aqueous solution comprising a strong consolidated body of fibrous material impregnated with heat-hardened resinous material and having distributed through said resinous material, at least at the surface of the bearing lining and the region adjacent thereto, a finely divided relatively water-insoluble alkaline earth metal aluminate in sufficient amount and distribution to neutralize the acidity of the lubricant employed in the operation of the bearing.

9. The bearing of claim 8 wherein the alkaline earth metal aluminate is in crystalline form.

GUSTAVE E. LANDTT.
JOHN A. PETHO.